(12) United States Patent
Okada et al.

(10) Patent No.: US 11,512,167 B2
(45) Date of Patent: Nov. 29, 2022

(54) POLYETHER POLYOL AND POLYOL SYSTEM LIQUID

(71) Applicant: AGC Inc., Chiyoda-ku (JP)

(72) Inventors: Shinji Okada, Chiyoda-ku (JP); Norihito Miyagawa, Chiyoda-ku (JP); Tomoyuki Suzuki, Chiyoda-ku (JP); Takayuki Sasaki, Chiyoda-ku (JP); Takashi Ito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 152 days.

(21) Appl. No.: 16/985,330

(22) Filed: Aug. 5, 2020

(65) Prior Publication Data

US 2020/0392285 A1 Dec. 17, 2020

Related U.S. Application Data

(63) Continuation of application No. PCT/JP2019/004887, filed on Feb. 12, 2019.

(30) Foreign Application Priority Data

Feb. 14, 2018 (JP) .............................. JP2018-024193

(51) Int. Cl.
*C08G 65/12* (2006.01)
*C08G 18/48* (2006.01)

(52) U.S. Cl.
CPC ........... *C08G 65/12* (2013.01); *C08G 18/485* (2013.01)

(58) Field of Classification Search
CPC ............ C08G 18/1833; C08G 18/2063; C08G 18/3206; C08G 18/3275; C08G 18/4072; C08G 18/4804; C08G 18/4808; C08G 18/4812; C08G 18/4825; C08G 18/4829; C08G 18/4837; C08G 18/4841; C08G 18/485; C08G 18/4866; C08G 18/632; C08G 18/6688; C08G 18/7607; C08G 18/0058; C08G 18/0086

See application file for complete search history.

(56) References Cited

U.S. PATENT DOCUMENTS

| 5,670,601 A * | 9/1997 | Allen ................. C08G 18/4841 528/65 |
| 5,689,012 A | 11/1997 | Pazos et al. |
| 6,028,230 A | 2/2000 | Le-Khac et al. |
| 2008/0021191 A1 | 1/2008 | Reese et al. |
| 2012/0208912 A1* | 8/2012 | Sasaki ................. C08G 18/7621 521/115 |
| 2012/0252916 A1 | 10/2012 | Sasaki et al. |
| 2013/0030068 A1* | 1/2013 | Sasaki ................. C08G 18/4812 521/126 |
| 2013/0281562 A1* | 10/2013 | Burckhardt .......... C08G 18/289 524/588 |
| 2013/0345331 A1* | 12/2013 | Suzuki ................ C08G 18/7664 525/259 |
| 2014/0031443 A1 | 1/2014 | Sasaki et al. |

FOREIGN PATENT DOCUMENTS

| CN | 101077480 A | 11/2007 |
| EP | 1 400 281 B1 | 7/2010 |
| JP | 2001-506284 A | 5/2001 |
| JP | 2002-517578 A | 6/2002 |
| JP | 2008-024939 A | 2/2008 |
| WO | WO 2012/133812 A1 | 10/2012 |

OTHER PUBLICATIONS

International Search Report dated May 21, 2019 in PCT/JP2019/004887 filed on Feb. 12, 2019, citing documents AA-AD & AO-AR therein, 2 pages.

* cited by examiner

*Primary Examiner* — John M Cooney
(74) *Attorney, Agent, or Firm* — Oblon, McClelland, Maier & Neustadt, L.L.P.

(57) ABSTRACT

To provide a polyether polyol having a high degree of freedom in the design of a polyurethane foam, and capable of providing a polyol system solution excellent in storage stability.

A polyether polyol having a polyoxyalkylene chain consisting of oxyalkylene units, and having a degree of unsaturation of at most 0.020 meq/g, a hydroxy value of from 1 to 80 mgKOH/g, a content of oxyethylene units of from 0 to 50 mass %, and a content of ultra-high molecular weight components which have molecular weights of from 12 to 46 times the number average molecular weight of at most 1,000 mass ppm. The number average molecular weight is a molecular weight as calculated as polystyrene measured by gel permeation chromatography (GPC) method, and the content of ultra-high molecular weight components is a value measured by high performance liquid chromatography (HPLC) method using a charged aerosol detector (CAD).

13 Claims, 3 Drawing Sheets

Fig. 1A

Before storage

Fig. 1B

After storage

Fig. 2A

Before storage

Fig. 2B

After storage

POLYETHER POLYOL AND POLYOL SYSTEM LIQUID

TECHNICAL FIELD

The present invention relates to a polyether polyol, and a polyol system solution using it.

BACKGROUND ART

A polyurethane foam is produced by reacting a polyol and a polyisocyanate compound in the presence of a urethane-forming catalyst and a blowing agent.

Specifically, a polyol system solution having a polyol, a blowing agent, a catalyst and the like mixed, and a polyisocyanate compound are individually prepared, mixed and reacted to produce a polyurethane foam.

The polyol may be stored separately from the blowing agent, the catalyst and the like in some cases, and may be stored in the form of a polyol system solution in other cases.

Storage in a state of a polyol system solution is advantageous in simplification of production equipment since it is not necessary to provide storage tanks for separate storage of the respective components.

However, if the polyol is stored for a long time in the state of a polyol system solution, physical properties of a polyurethane foam produced by using such a polyol system solution may sometimes decrease, and accordingly the storage stability of the polyol system solution is required.

Patent Document 1 discloses that the storage stability of a polyol system solution can be improved by making from 1 to 23 moles of oxyethylene groups per mole of molecules be present at the terminal of a polyoxyalkylene chain.

PRIOR ART DOCUMENTS

Patent Documents

Patent Document 1: WO2012/133812

DISCLOSURE OF INVENTION

Technical Problem

However, by the method disclosed in Patent Document 1, the number of moles of the oxyethylene groups at the terminal of the polyoxyalkylene chain is limited to 23 or lower per mole of molecules, and thus, depending upon the composition of the polyol system solution, no favorable physical properties of the resulting polyurethane foam will be obtained, and the degree of freedom in the design of the polyurethane foam tends to be low.

Under these circumstances, the present invention provides a polyether polyol having a high degree of freedom in the design of a polyurethane foam, and capable of providing a polyol system solution excellent in storage stability, and a polyol system solution using it.

Solution to Problem

The present invention provides [1] to [12].

[1] A polyether polyol having a polyoxyalkylene chain consisting of oxyalkylene units, and having a degree of unsaturation of at most 0.020 meq/g, a hydroxy value of from 1 to 80 mgKOH/g, a content of oxyethylene units to the total mass of the polyether polyol of from 0 to 50 mass %, a number average molecular weight which is a molecular weight as calculated as polystyrene determined by gel permeation chromatography of from 2,000 to 50,000, and a content of ultra-high molecular weight components which have molecular weights of from 12 to 46 times the number average molecular weight of at most 1,000 mass ppm.

[2] The polyether polyol according to [1], which has an average number of hydroxy groups per molecule of the polyether polyol of from 2 to 8.

[3] The polyether polyol according to [1] or [2], wherein the oxyalkylene unit has from 2 to 4 carbon atoms.

[4] The polyether polyol according to any one of [1] to [3], wherein at least part of the oxyalkylene units at the terminal of the polyoxyalkylene chain are oxyethylene units.

[5] The polyether polyol according to any one of [1] to [4], which contains oxypropylene units as the oxyalkylene units other than oxyethylene units, and has a content of the oxypropylene units of at least 50 mass %.

[6] The polyether polyol according to any one of [1] to [5], which is a polyether polyol obtained by subjecting propylene oxide to ring-opening addition polymerization to an initiator, and then subjecting ethylene oxide to ring-opening addition polymerization.

[7] The polyether polyol according to [6], which is a polyether polyol obtained by conducting the ring-opening addition polymerization of propylene oxide in the presence of a double metal cyanide complex catalyst.

[8] The polyether polyol according to any one of [1] to [7], for producing a polyurethane foam.

[9] The polyether polyol according to [8], wherein the polyurethane foam is a flexible polyurethane foam.

[10] A composition for producing a polyurethane foam, which contains the polyether polyol as defined in any one of [1] to [9].

[11] A polyol system solution, which contains the polyether polyol as defined in any one of [1] to [9], a catalyst, and a blowing agent.

[12] The polyol system solution according to [11], which is a polyol system solution for producing a polyurethane foam by molding method.

Advantageous Effects of Invention

The polyether polyol of the present invention has a high degree of freedom in the design of a polyurethane foam, and provides a polyol system solution excellent in storage stability.

The polyol system solution of the present invention has a high degree of freedom in the design of a polyurethane foam, and is excellent in storage stability.

When the polyol system solution is excellent in storage stability, such a phenomenon is suppressed that mechanical properties of a polyurethane foam obtained by using a stored polyol system solution are lower than mechanical properties of a polyurethane foam obtained by using a polyol system solution not stored.

BRIEF DESCRIPTION OF DRAWINGS

FIGS. 1A and 1B are photographs of a cross section of a flexible polyurethane foam obtained in Ex. 1 described later, taken with the same magnifications as in FIGS. 2A and B described later.

FIGS. 2A and B are photographs of a cross section of a flexible polyurethane foam obtained in Ex. 2 described hereinafter, taken with the same magnifications as in FIGS. 1A and B.

FIGS. 3A and 3B is chromatograms of polyol C2 obtained in Production Example 3 described later, measured by the following CAD-HPLC method. FIG. 3B illustrates the molecular weight range (molecular weight 46× and 12×) of ultra-high molecular weight components in Table 1 described later.

DESCRIPTION OF EMBODIMENTS

In this specification, meanings and definitions of terms are as follows.

"ppm" is based on mass unless otherwise specified.

The "isocyanate index" is a value represented by 100 times the number (molar ratio) of isocyanate groups to the total of active hydrogen atoms in the polyol system solution.

The "number average molecular weight, weight average molecular weight and molecular weight distribution of the polyether polyol" are molecular weights as calculated as polystyrene obtained by gel permeation chromatography (hereinafter referred to as "GPC") measurement using an IR detector, using tetrahydrofuran (hereinafter referred to as "THF") as an eluent. The molecular weight distribution is a value of the weight average molecular weight/number average molecular weight (hereinafter referred to as "Mw/Mn").

The "ultra-high molecular weight components" are components having molecular weights of from 12 times to 46 times the number average molecular weight of the polyether polyol measured by the above method.

The "content of the ultra-high molecular weight components" is a value obtained by the following HPLC method (hereinafter referred to as "CAD-HPLC method").

CAD-HPLC Method (1) A sample having a polyether polyol as a test specimen dissolved in THF at a concentration of 0.6 mass % is analyzed under the following HPLC conditions to obtain a chromatogram of which the X axis represents the retention time and the Y axis represents the signal intensity.

(2) Using a polystyrene as a standard substance, a calibration curve representing the relation between the molecular weight and the retention time is prepared.

(3) Using the calibration curve prepared in (2), the retention time X1 corresponding to the molecular weight of 12 times the number average molecular weight and the retention time X2 corresponding to the molecular weight of 46 times the number average molecular weight are obtained.

(4) An area of a portion surrounded by the chromatogram, the base line, a line X=X1 and a line X=X2 is obtained.

(5) A plurality of standard solutions containing a polystyrene having a molecular weight of 92,600 at different concentrations are analyzed under the same HPLC conditions as in (1), and an analytical curve with an intercept of 0 representing the relation between the area of a portion surrounded by the obtained chromatogram and the base line, and the concentration of the polystyrene having a molecular weight of 92,600, is prepared by least squares method.

(6) Using the analytical curve prepared in (5), the area obtained in (4) is calculated as the concentration of a polystyrene having a molecular weight of 92,600, which is taken as the concentration of ultra-high molecular weight components.

(7) From the value of the concentration obtained in (6), the content of the ultra-high molecular weight components in the test specimen is calculated.

HPLC Conditions

Apparatus: High performance liquid chromatography apparatus
Detector: Charged aerosol detector
Eluent: Tetrahydrofuran
Flow rate of eluent: 0.2 mL/min
Amount of sample injected: 20 μL
Column: A column for an organic solvent-type liquid chromatography having an inner diameter of 4.6 mm, a length of from 150 to 250 mm and a number of theoretical plates of at least 16,000 TP/column, packed with a styrene-divinylbenzene copolymer having an average particle size of from 3 to 4 μm, with an exclusion limit of at least 1,000,000 when the molecular weight of a polystyrene is measured using tetrahydrofuran as an eluent, on the upstream side, and such a column with an exclusion limit of from 20,000 to 100,000, on the downstream side, connected in series.

As THF which is the solvent of the sample and the eluent, THF for high performance liquid chromatography containing no stabilizer (hereinafter referred to as "THF for HPLC") is used.

The column on the upstream side may, for example, be Shodex KF-404HQ manufactured by Showa Denko K. K. or TSKgel SuperMultiporeHZ-M manufactured by TOSOH CORPORATION.

The column on the downstream side may, for example, be Shodex KF-403HQ manufactured by Showa Denko K. K. or TSKgel SuperHZ2500 manufactured by TOSOH CORPORATION.

Two or more columns of the same type may be connected in series to adjust the number of theoretical plates. It is preferred to dispose a column with a higher exclusion limit and a column with a lower exclusion limit in series in this order.

Polyether Polyol

The polyether polyol of the present invention has a polyoxyalkylene chain consisting of oxyalkylene units, and has hydroxy groups at the terminal of the polyoxyalkylene chain. The average number of hydroxy groups per molecule of the polyether polyol is preferably from 2 to 8. The number of hydroxy groups of the polyether polyol corresponds to the number of average active hydrogen atoms per molecule of the after-described initiator.

The oxyalkylene units are units formed by ring-opening addition polymerization of an alkylene oxide. The alkylene oxide preferably has from 2 to 20 carbon atoms and may, for example, be ethylene oxide (hereinafter referred to as "EO"), propylene oxide (hereinafter referred to as "PO"), 1,2-butylene oxide, 2,3-butylene oxide, styrene oxide or a $C_{5\text{-}20}$ α-olefin oxide.

The alkylene oxide more preferably has from 2 to 4 carbon atoms, and the alkylene oxide is more preferably EO, PO, 1,2-butylene oxide or 2,3-butylene oxide.

The polyether polyol may contain two or more types of oxyalkylene units.

The two or more types of oxyalkylene units may form a random chain, may form a block chain, or may form a combination thereof.

Hereinafter, oxyethylene units (—CH$_2$CH$_2$O—) formed by ring-opening addition polymerization of EO will sometimes be referred to as "EO units", and oxypropylene units (—CH$_2$CH(CH$_3$)O—) formed by ring-opening addition polymerization of PO will sometimes be referred to as "PO units".

The polyether polyol may, for example, be a polyether polyol in which the polyoxyalkylene chain consists of PO units, or a polyether polyol in which the polyoxyalkylene chain consists of EO units and C$_{3-20}$ oxyalkylene units. The C$_{3-20}$ oxyalkylene units are preferably PO units.

The content of the EO units to the total mass of the polyether polyol of the present invention (hereinafter referred to as "EO content") is from 0 to 50 mass %. In a case where the polyether polyol contains EO units, the EO units are preferably present at the terminal portion of the polyoxyalkylene chain as described hereinafter. In a case where the polyoxyalkylene chain terminal portion contains the EO units, the EO content in such a polyether polyol is preferably from 1 to 30 mass %, more preferably from 5 to 20 mass %. When the polyoxyalkylene chain terminal portion contains EO units, the reactivity with the polyisocyanate tends to be high, and when a polyurethane foam is formed, it is easily cured. When the EO content is at most the above upper limit value, the compression set under humid conditions among the polyurethane foam physical properties is likely to be maintained.

The terminal of the polyoxyalkylene chain in the polyether polyol is preferably the EO unit. When the terminal of the polyoxyalkylene chain is the EO unit, the hydroxy group having the oxygen atom of the EO unit as the constituting atom is a primary hydroxy group. The primary hydroxy group is preferred in view of high reactivity with the polyisocyanate compound. In order to produce a polyether polyol having a high proportion of primary hydroxy groups, it is preferred to use EO as the alkylene oxide to be finally reacted at the time of ring-opening addition polymerization of the alkylene oxide, thereby to increase the proportion of the polyoxyalkylene chain terminal units being EO units.

Further, in a case where the terminal portion of the polyether polyol contains the EO units, the higher the EO content, the more the storage stability of the polyol system solution tends to decrease and the higher the effects of the present invention.

The average number of moles of EO added by ring-opening to the terminal of the polyether chain, per mole of polyether polyol molecules (hereinafter sometimes referred to as "terminal EO added molar number") is preferably from 5 to 100 mol, more preferably from 10 to 40 mol, further preferably from 15 to 35 mol. When the terminal EO added molar number is at least the above lower limit value, the polyurethane foam tends to be cured when formed, and the hardness among the polyurethane foam physical properties is likely to develop, and when it is at most the upper limit value, the compression set under humid conditions among the polyurethane foam physical properties can be kept.

The polyether polyol is, in view of flexibility and productivity, preferably such that the polyoxyalkylene chain contains PO units, more preferably such that the polyoxyalkylene chain contains EO units and PO units, further preferably such that the polyoxyalkylene chain consists of EO units and PO units.

It is preferred that the polyoxyalkylene chain consists of EO units and PO units and has a block chain consisting of EO units at its terminal. In such a case, in the polyoxyalkylene chain, the portion other than the block chain of the EO units at the terminal may be a block chain consisting of PO units, may be a random chain consisting of PO units and EO units, or may consist of a block chain consisting of EO units and a block chain consisting of PO units alternately disposed. More preferably, the portion other than the block chain of EO units at the terminal is a block chain consisting of PO units, or a block chain having a block chain consisting of EO units and a block chain consisting of PO units, the block chain consisting of EO units being disposed on the initiator side.

The content of ultra-high molecular weight components having molecular weights of from 12 to 46 times (12× to 46×) the number average molecular weight X of the polyether polyol, is at most 1,000 ppm, preferably at most 950 ppm, more preferably at most 850 ppm, further preferably at most 500 ppm, particularly preferably at most 200 ppm, to the total mass of the polyether polyol.

When the content of the ultrahigh-molecular weight components is at most the above upper limit value, the polyol system solution will be excellent in storage stability. The content of the ultrahigh-molecular weight components is preferably as low as possible, and it is more preferred that no such components are detected by the CAD-HPLC method.

The number average molecular weight of the polyether polyol is preferably from 2,000 to 50,000, more preferably from 3,000 to 40,000, further preferably from 5,000 to 30,000. When the number average molecular weight is at least the above lower limit value, the flexible polyurethane foam tends to be particularly flexible, and when it is at most the upper limit value, the viscosity will hardly be high.

The number average molecular weight per hydroxy group of the polyether polyol is preferably from 250 to 25,000, more preferably from 600 to 20,000, further preferably from 800 to 15,000, particularly preferably from 1,000 to 12,000, most preferably from 1,500 to 10,000.

The degree of unsaturation of the polyether polyol is at most 0.020 meq/g, preferably at most 0.015 meq/g, more preferably at most 0.010 meq/g. When it is at most the above upper limit value, a polyurethane foam produced by using such a polyether polyol will be excellent in mechanical properties. The degree of unsaturation is preferably low, and is most preferably 0.

The polyether polyol, which has a low degree of unsaturation as described above, and which can provide a polyurethane foam with excellent compression set under humid conditions, is preferably used particularly for production of a flexible polyurethane foam.

The average number of hydroxy groups of the polyether polyol is preferably from 2 to 8, more preferably from 2 to 6. When the number of hydroxy groups is within the above range, a flexible polyurethane foam having favorable hardness and excellent durability is likely to be obtained by using such a polyether polyol.

Mw/Mn of the polyether polyol is preferably from 1.00 to 1.40, more preferably from 1.00 to 1.20, further preferably from 1.00 to 1.10. When Mw/Mn is within the above range, the viscosity will hardly be high.

The hydroxy value of the polyether polyol is from 1 to 80 mgKOH/g, preferably from 2 to 60 mgKOH/g, more preferably from 10 to 40 mgKOH/g, further preferably from 15 to 30 mgKOH/g. When it is at most the above upper limit value of the above range, a flexible polyurethane foam produced by using such a polyether polyol tends to have a favorable rebound resilience, and when it is at least the lower limit value, the crosslink density tends to be sufficient, and the resulting polyurethane foam tends to have favorable hardness.

The viscosity of the polyether polyol at 25° C. is preferably from 200 to 100,000 mPa·s, more preferably from 220 to 70,000 mPa·s, further preferably from 250 to 50,000 mPa·s. Within such a range, the obtainable system solution tends to have favorable workability, and is easily mixed with a polyisocyanate when a polyurethane foam is produced.

Method for Producing Polyether Polyol

The polyether polyol of the present invention may be produced without any particularly restriction so long as a polyether polyol having a content of the ultrahigh molecular weight components by analysis by the CAD-HPLC method of at most 1,000 ppm can be produced. Such a polyether polyol may be produced by selecting the material to be reacted used for production, by purification, or by adjusting production conditions such as the rate of feed of the material alkylene oxide, the reaction temperature or the reaction pressure, or may be produced by once a polyether polyol and fractionating it into ultra-high molecular weight components and the other components.

The polyether polyol may be produced by subjecting an alkylene oxide to ring-opening addition polymerization to an initiator in the presence of an alkylene oxide ring-opening addition polymerization catalyst by a known method, and fractionating the obtained polyether polyol into ultra-high molecular weight components and the other components to obtain said other components.

The number of active hydrogen atoms in one molecule of the initiator is preferably from 2 to 8, more preferably from 2 to 6. When the number of active hydrogen atoms is at least the above lower limit value, forming tends to be stabilized at the time of forming a polyurethane foam, and the hardness among the polyurethane foam physical properties tends to be favorable. When it is at most the upper limit value, the mechanical strength among the polyurethane foam physical properties tends to be favorable. Two or more types of initiators may be used in combination.

The active hydrogen means a hydrogen atom in a reactive group to which the alkylene oxide may be subjected to ring-opening addition, and means a hydrogen atom bonded to an oxygen atom, a nitrogen atom, a sulfur atom or the like. Further, water is considered to have active hydrogen. Hereinafter, a group having active hydrogen will be referred to as an active hydrogen-containing group. The active hydrogen-containing group is also a reactive group reactive with the isocyanate group.

The initiator may, for example, be water, and a carboxylic acid, amine, amide, polyhydric alcohol, saccharide or its derivative, or polyhydric phenol, having from 2 to 8 active hydrogen atoms in one molecule.

The active hydrogen-containing group of the initiator is preferably a hydroxy group. The average number of hydroxy groups in the initiator is preferably from 2 to 8, more preferably from 2.5 to 6.5, further preferably from 2.5 to 5.5.

In a case where a flexible polyurethane foam is to be produced by using the polyether polyol, when the average number of hydroxy groups is at least the above lower limit value, the flexible polyurethane foam will be excellent in hardness, and when it is at most the above upper limit value, the flexible polyurethane foam will be excellent in durability.

The initiator having a hydroxy group is preferably a polyhydric alcohol. Specifically, it is preferably ethylene glycol, propylene glycol, glycerin, trimethylolpropane or pentaerythritol, more preferably ethylene glycol, propylene glycol or glycerin.

As the initiator, a polyether polyol having an alkylene oxide subjected to ring-opening addition polymerization to a compound having an active hydrogen-containing group may also be used. The number of hydroxy groups per molecule of the initiator is preferably from 2 to 8. In a case where the polyether polyol as the initiator is produced by using an alkali catalyst, an initiator containing EO units can be produced. In a case where the polyether polyol as the initiator is produced by using the after-described DMC catalyst, an initiator having a high molecular weight and having a low degree of unsaturation can be produced. The number average molecular weight of the polyether polyol as the initiator is preferably at most ½, more preferably at most ⅕, the number average molecular weight of the polyether polyol to be produced. The polyoxyalkylene chain in the polyether polyol of the present invention produced by using the polyether polyol as the initiator, means a polyoxyalkylene chain having the polyoxyalkylene chain of the initiator and the polyoxyalkylene chain formed by ring-opening addition polymerization of the alkylene oxide to the initiator continuously disposed.

The number average molecular weight of the initiator is preferably from 18 to 20,000, more preferably from 300 to 10,000, further preferably from 600 to 5,000. When it is at least the above lower limit value, the time until the ring-opening addition polymerization of the alkylene oxide starts in the presence of the alkylene oxide ring-opening addition polymerization catalyst tends to be short. When it is at most the above upper limit value, the viscosity of the initiator will not be too high, and the ring-opening addition polymerization reaction is likely to uniformly proceed.

The ring-opening addition polymerization catalyst for an alkylene oxide except for EO is preferably a double metal cyanide complex catalyst (hereinafter referred to as "DMC catalyst"). Since the DMC catalyst has high polymerization activity, formation of a monool having an unsaturated bond as a by-product in the ring-opening addition polymerization reaction of an alkylene oxide having at least 3 carbon atoms such as PO is likely to be suppressed, and the resulting polyether polyol tends to have a low degree of unsaturation. Further, the polyether polyol tends to have a low Mw/Mn.

On the other hand, it is usually difficult to subject EO to ring-opening addition polymerization to a polyhydric alcohol or a polyether polyol using the DMC catalyst. Accordingly, the ring-opening addition polymerization catalyst for EO is preferably an alkali catalyst such as an alkali metal hydroxide. The above by-product will not form when ring-opening addition polymerization of EO is conducted using an alkali catalyst, however, a monool having an unsaturated bond as a by-product is likely to form as described above, when ring-opening addition polymerization of EO and the like is conducted using an alkali catalyst.

Accordingly, to produce a polyether polyol in which the terminal of the polyoxyalkylene chain comprises a block chain of EO units, it is preferred to subject PO or the like to ring-opening addition polymerization to an initiator using the DMC catalyst and then subjecting EO to ring-opening addition polymerization using an alkali catalyst.

When a flexible polyurethane foam is produced by using a polyether polyol having a low degree of unsaturation, the resulting flexible polyurethane foam has improved mechanical properties and compression set as compared with a case of using a polyether polyol having a high degree of unsaturation. A polyether polyol tends to have a low viscosity and will be excellent in handling efficiency as Mw/Mn is closer to 1.

On the other hand, when a polyether polyol is produced by using the DMC catalyst, ultra-high molecular weight components are likely to form, and accordingly the effects by application of the present invention will be significant.

The DMC catalyst may, for example, be a DMC catalyst represented by the formula (1) in paragraph [0015] of Patent Document 1, or a DMC catalyst represented by the formula in paragraph [0013] of Japanese Patent No. 4949605. The DMC catalyst is preferably a double metal cyanide complex having a reaction product obtainable by reacting a zinc halide and an alkali metal cyanocobaltate, and t-butyl alcohol as an organic ligand coordinated.

To produce a polyether polyol in which the terminal of the polyoxyalkylene chain comprises a block chain of EO units, a known method may be employed, and for example, the method as disclosed in Patent Document 1 or Japanese Patent No. 4949605 may be employed.

Polyol Composition

The polyol composition of the present invention is a composition containing the polyether polyol and is used for producing a polyurethane foam. The polyol composition is preferably the following polyol system solution. However, the polyol composition is not limited to the polyol system solution, and may be a composition containing the polyether polyol of the present invention and polymer particles (that is, polymer polyol), a polyol composition containing the polyether polyol of the present invention and other polyether polyol, or the like.

Polyol System Solution

The polyol system solution is a solution to be reacted with a polyisocyanate compound in production of a polyurethane foam.

The polyol system solution contains the polyether polyol, a urethane-forming catalyst and a blowing agent. It may further contain polymer particles, a crosslinking agent, a cell opener, a foam stabilizer, other polyol not corresponding to the polyether polyol, and as the case requires, other compounding ingredient.

The other polyol may, for example, be a polyether polyol not corresponding to the above polyether polyol, a polyester polyol or a polycarbonate polyol. The other compounding ingredient may, for example, be a filler, a stabilizer, a coloring agent or a flame retardant, and known compounding ingredients may be used in combination without any restriction depending upon physical properties desired.

The urethane-forming catalyst is a catalyst which promotes urethane-forming reaction. It may, for example, be a tertiary amine compound, a reactive amine compound, an organic metal compound or a carboxylic acid metal salt. Two or more types of the urethane-forming catalyst may be used in combination.

The tertiary amine compound may, for example, be an aliphatic amine such as a dipropylene glycol solution of triethylenediamine, a dipropylene glycol solution of bis-(2-dimethylaminoethyl) ether, a morpholine or a piperazine, or an alicyclic amine.

The amount of the tertiary amine compound used is preferably at most 2 parts by mass, more preferably from 0.05 to 1.5 parts by mass per 100 parts by mass of the total amount of the polyether polyol and other polyol.

The organic metal compound may, for example, be an organic tin compound, an organic bismuth compound, an organic lead compound or an organic zinc compound. An organic tin compound is preferred, whereby high activity will be obtained. As specific examples, di-n-butyltin oxide, di-n-butyltin dilaurate, di-n-butyltin, di-n-butyltin diacetate, di-n-octyltin oxide, di-n-octyltin dilaurate, monobutyltin trichloride, di-n-butyltin dialkyl mercaptan and di-n-octyltin dialkyl mercaptan may be mentioned.

The amount of the organic metal compound used is preferably from 0.005 to 2 parts by mass, more preferably from 0.01 to 1.5 parts by mass per 100 parts by mass of the total amount of the polyether polyol and other polyol.

The blowing agent is preferably either one or both of water and an inert gas. The inert gas may, for example, be air, nitrogen gas, or liquified carbon dioxide gas. In view of handling efficiency and reduction in the environmental burden, water alone is preferred.

The amount of the blowing agent used may be properly adjusted depending on the requirement such as expansion ratio.

In a case where the blowing agent consists solely of water, the amount of water used is preferably from 0.1 to 10 parts by mass, more preferably from 0.5 to 6 parts by mass per 100 parts by mass of the total amount of the polyether polyol and other polyol.

The crosslinking agent is a compound having at least two active hydrogen atoms. Two or more types of such crosslinking agents may be used in combination.

It is preferred to use, as the crosslinking agent, either one or both of the following first crosslinking agent and second crosslinking agent.

The first crosslinking agent is a polyoxyalkylene polyol having a hydroxy value of higher than 200 and at most 2,500 mgKOH/g, obtained by subjecting an alkylene oxide to ring-opening addition polymerization to an initiator having at least two active hydrogen atoms in the presence of a catalyst or without using a catalyst.

The second crosslinking agent is a compound having no polyoxyalkylene chain and having at least two hydrogen atoms, and is preferably a compound having a hydroxy group having a hydroxy value of higher than 1,000 mgKOH/g.

The second crosslinking agent may, for example, be ethanolamine (such as monoethanolamine, diethanolamine or triethanolamine), a polyhydric alcohol (such as ethylene glycol, 1,4-butanediol, neopentyl glycol, 1,6-hexanediol, diethylene glycol, triethylene glycol, dipropylene glycol, glycerin or N-alkyldiethanol) or an amine crosslinking agent (such as an aromatic polyamine, an aliphatic polyamine or an alicyclic polyamine).

The total amount of the crosslinking agent used is preferably from 0.1 to 20 parts by mass, more preferably from 0.2 to 15 parts by mass, further preferably from 0.3 to 10 parts by mass per 100 parts by mass of the total amount of the polyether polyol and other polyol.

The cell opener is a polyether polyol having an average number of hydroxy groups of from 2 to 8, a hydroxy value of from 20 to 200 mgKOH/g and an EO content of at least 60 mass %, obtained by subjecting EO, or a mixture of EO and PO, to ring-opening addition polymerization to the initiator in the presence of an alkali catalyst.

The EO content is preferably from 65 to 100 mass %, more preferably from 70 to 90 mass %.

The average number of hydroxy groups of the cell opener is preferably from 2 to 6, more preferably from 2 to 4.

The hydroxy value of the cell opener is preferably from 24 to 150 mgKOH/g, more preferably from 24 to 100 mgKOH/g, further preferably from 24 to 60 mgKOH/g.

The total amount of the cell opener is preferably from 0.1 to 10 parts by mass, more preferably from 0.1 to 7 parts by mass per 100 parts by mass of the total amount of the polyether polyol and other polyol.

The foam stabilizer may, for example, be a silicone foam stabilizer or a fluorinated foam stabilizer. The amount of the foam stabilizer used is preferably from 0.001 to 5 parts by mass, more preferably from 0.005 to 3 parts by mass, further preferably from 0.01 to 2 parts by mass per 100 parts by mass of the total amount of the polyether polyol and other polyol.

In a case where the polyol system solution contains polymer particles, it is preferred to incorporate a polymer-dispersed polyol as other polyol in the polyol system solution.

The polymer-dispersed polyol is preferably a polymer-dispersed polyol having polymer particles formed by polymerizing a monomer in a base polyol, and may be produced by a known method as disclosed in JP-A-2005-325251, JP-A-2014-234394, WO2012/115251 or the like. The base polyol may be the above polyether polyol of the present invention, may be other polyol, or may be a combination thereof.

Other polyol is preferably a polyether polyol obtained by subjecting an alkylene oxide to ring-opening addition polymerization to an initiator in the presence of an alkali catalyst. The degree of unsaturation of the polyether polyol obtained by using an alkali catalyst is, for example, higher than 0.020 meq/g and at most 0.100 meq/g.

The hydroxy value of the base polyol is preferably from 15 to 60 mgKOH/g, more preferably from 17 to 40 mgKOH/g. The hydroxy value of the base polyol in a case where the polyether polyol and other polyol are used in combination, is an average hydroxy value of the entire mixture.

The monomer is preferably a vinyl monomer (such as acrylonitrile, styrene, a methacrylic acid ester or an acrylic acid ester).

In a case where the polymer-dispersed polyol is used, the content of the polymer-dispersed polyol to the total amount of the polyether polyol and other polyol is preferably higher than 0 and at most 60 mass %, more preferably from 5 to 60 mass %, further preferably from 10 to 50 mass %.

Method for Producing Polyurethane Foam

A polyurethane foam is produced by a method of reacting the polyether polyol and a polyisocyanate compound in the presence of the blowing agent and the catalyst.

A polyurethane foam is produced preferably by a method of foaming a reactive mixture having the polyol system solution and a polyisocyanate compound mixed.

The polyisocyanate compound may, for example, be an aromatic polyisocyanate compound having at least two isocyanate groups, a mixture of two or more types thereof, or a modified polyisocyanate obtained by modifying them.

It is preferably at least one member selected from the group consisting of tolylene diisocyanate (hereinafter referred to as "TDI"), diphenylmethane diisocyanate (hereinafter referred to as "MDI"), polymethylene polyphenyl isocyanate (hereinafter referred to as "polymeric MDI") and their modified products. The modified product may, for example, be a prepolymer modified product, a nurate modified product, a urea modified product or a carbodiimide modified product.

The polyisocyanate compound may be a prepolymer. The prepolymer may, for example, be a prepolymer of TDI, MDI or polymeric MDI, and a natural fat/oil-derived polyol, a polyether polyol obtained by subjecting an alkylene oxide to ring-opening addition polymerization to a natural fat/oil-derived polyol, or a petroleum polyether polyol.

The polyisocyanate compounds may be used as a mixture of two or more.

The amount of the polyisocyanate compound used is preferably from 70 to 125, more preferably from 80 to 120, further preferably from 85 to 120, by the isocyanate index.

The foaming method may, for example, be a method of making a reactive mixture foam in a closed mold to form a foam (hereinafter referred to as "molding method") or may be a method of making the reactive mixture foam in an open system to form a slab foam (hereinafter referred to as "slab method").

As the method of forming the reactive mixture by the slab method, one shot method, semi-prepolymer method or prepolymer method may, for example, be mentioned.

As the molding method, preferred is a method of directly injecting the reactive mixture into a closed mold (reaction-injection molding method) or a method of injecting the reactive mixture into a mold in an open state, and closing the mold. As the latter method, it is preferably carried out by a method of forming a reactive mixture and injecting it into a mold by using a low pressure foaming machine or a high pressure foaming machine.

The high pressure foaming machine is preferably of a type to mix two liquids. One of the two liquids is the polyisocyanate compound, and the other is the polyol system solution.

The temperature of the reactive mixture to be used for foaming is preferably from 10 to 40° C. When the temperature is at least 10° C., the viscosity of the reactive mixture will not be too high, whereby liquid mixing tends to be good. When the temperature is at most 40° C., the reactivity of the reactive mixture will not be too high, whereby the moldability tends to be good.

The mold temperature is preferably from 10 to 80° C., more preferably from 30 to 70° C.

The curing time is preferably from 1 to 20 minutes, more preferably from 3 to 10 minutes, further preferably from 3 to 8 minutes. When the curing time is at least the lower limit value, curing will be sufficiently conducted, and when it is at most the upper limit value, productivity will be good.

In the slab method, usually, the polyol system solution is used without being stored in many cases, whereas in the mold method, it is common that the polyol system solution is used after stored. Accordingly, the effect of the present invention is more likely to be obtained in the mold method.

The polyether polyol and the polyol system solution may be used for both production of a flexible polyurethane foam and production of semi-rigid polyurethane foam. They are preferably used for production of a flexible polyurethane foam. The flexible polyurethane foam may, for example, be an automobile seat cushion, a furnishing cushion or a sound absorbing material.

According to the present invention, it is possible to improve storage stability of the polyol system solution by reducing the specific ultra-high molecular weight components in the polyether polyol to a predetermined proportion or lower.

In the present invention, the content of the ultra-high molecular weight components in the polyether polyol is measured by the above CAD-HPLC method. The charged aerosol detector (CAD) used in the CAD-HPLC method has higher sensitivity than a conventional differential refractometer (RI) or evaporative light scattering detector (ELSD), as described in, for example, Chromatography, Vol. 27, No. 3 (2006), p. 119-124, BUNSEKI KAGAKU, Vol. 63, No. 10 (2014), p. 817-823, Chromatography, Vol. 132, No. 3 (2011), p. 161-170. Accordingly, by the CAD-HPLC method, a very small amount of ultra-high molecular weight components which have not been detected by a conventional GPC method using the above detector, can be measured.

For example, Japanese Patent No. 4949605 describes an example in which a polyether polyol produced by using a specific modified zinc hexacyanocobaltate complex catalyst having t-butyl alcohol coordinated, was analyzed by GPC method using ELSD, whereupon no high polymer polyol impurities were detected. However, the present inventors have produced a polyether polyol using such a catalyst and analyzed the polyether polyol by CAD-HPLC method, and found that the ultra-high molecular weight components were not sufficiently reduced as in the case of the above-described polyol C4.

JP-A-2002-517578 is to solve a problem such that a foam tends to collapse even by using a system solution immediately after preparation, due to surface activity-like effect of high molecular weight components, and discloses a method for producing a polyether polyol by suppressing high molecular tail by adding water and an aprotic Lewis acid. However, the present inventors have produced polyether polyols in the same manner as in Examples 1 and 3 disclosed in the Patent Document and analyzed the polyether polyols by CAD-HPLC method, and found that the ultra-high molecular weight components were not sufficiently reduced as in the case of the after-described polyols C5 and C6.

Mechanism of Action

The present invention is to solve a problem (storage stability) such that a system solution immediately after preparation has no problem, however, the foam physical properties decrease by the system solution being stored. The mechanism how the ultra-high molecular weight components influence the storage stability of the system solution in the present invention is not clearly understood, however, it is estimated that the problem does not result from the surface activity-like effect of the polymer which causes the problem of the system solution immediately after preparation, but ultra-high molecular weight components separated with time from the polyether polyol having a molecular weight in the vicinity of the average molecular weight, as the main component, during storage, have influence on the deterioration of the physical properties of the foam formed.

EXAMPLES

Now, the present invention will be described in further detail with reference to Examples. However, the present invention is not limited to such specific Examples.

Measurement Method

Hydroxy Value

The hydroxy value of the polyether polyol and the hydroxy value of the polymer-dispersed polyol were measured in accordance with JIS K1557-1B method (2007).

Degree of Unsaturation

The degree of unsaturation of the polyol was measured in accordance with JIS K1557-3 (2007).

Viscosity (25° C.)

The viscosity of the polyol was measured in accordance with JIS K1557-5 (2007).

EO Content

The EO content (mass %) was calculated from integrated values of a peak derived from a methyl group and a peak derived from a methylene group, in a $^1$H-NMR spectrum of the polyoxyalkylene polyol measured by a NMR apparatus at 300 MHz.

Terminal EO Added Molar Number

The terminal EO added molar number was calculated in accordance with the following formula.

Terminal EO added molar number=(number average molecular weight×EO content (mass %)/100)/44

Number Average Molecular Weight X, Mw/Mn

The molecular weight of the polyether polyol was analyzed by an RI detector by means of GPC system (manufactured by TOSOH CORPORATION, tradename: HLC-8320). As the column, two columns of TSK-GEL Super HZ4000 (4.6 mm×150 mm) and two columns of Super HZ2500 (4.6 mm×150 mm) were connected in series in this order. Using THF as an eluent at a flow rate of 0.35 mm/min, at a column temperature of 40° C., and using a polystyrene standard sample (manufactured by Agilent Technologies, tradename: Easical PS-2, molecular weight range: 580 to 400,000), an analytical curve was prepared, from which the number average molecular weight X and Mw/Mn were calculated. Further, the molecular weight (12×) of 12 times and the molecular weight (46×) of 46 times the number average molecular weight X were calculated. The components having molecular weights of from 12× to 46× are ultra-high molecular weight components.

Calculation of Content of Ultra-High Molecular Weight Components (CAD-HPLC Method)

HLPC Conditions

Apparatus and detector: High performance liquid chromatography apparatus (manufactured by ThermoFisher SCIENTIFIC, tradename: U3000 HPLC system, degasser: SRD-3600, pump: DGP3600SD, autosampler: WPS-3000TSL, column compartment: TCC-3000SD, UV-Vis detector: VWD-3400RS, charged aerosol detector: Corona Veo)

Eluent: THF for HPLC

Flow rate of eluent: 0.2 mL/min

Amount of sample injected: 20 µL

Column: One column on the upstream side described below and one column on the downstream side described below were connected in series in this order. The exclusion limits of the columns are exclusion limits in a case where the molecular weight of a polystyrene is measured using THF for HPLC as the eluent.

Column on upstream side: manufactured by Showa Denko K. K., tradename: Shodex KF-404HQ (a column for organic solvent type liquid chromatography, packed with a styrene divinylbenzene copolymer having an average particles size of 3 µm as the filler, having an inner diameter of 4.6 mm, a length of 250 mm, a number of theoretical plates of at least 25,000 TP/column, and an exclusion limit of 1,000,000).

Column on the downstream side: manufactured by Showa Denko K. K., tradename: Shodex KF-403HQ (a column for organic solvent type liquid chromatography, packed with a styrene divinylbenzene copolymer having an average particles size of 3 µm as the filler, and having an inner diameter of 4.6 mm, a length of 250 mm, a number of theoretical plates of at least 25,000 TP/column, and an exclusion limit of 70,000).

Figure 3A:
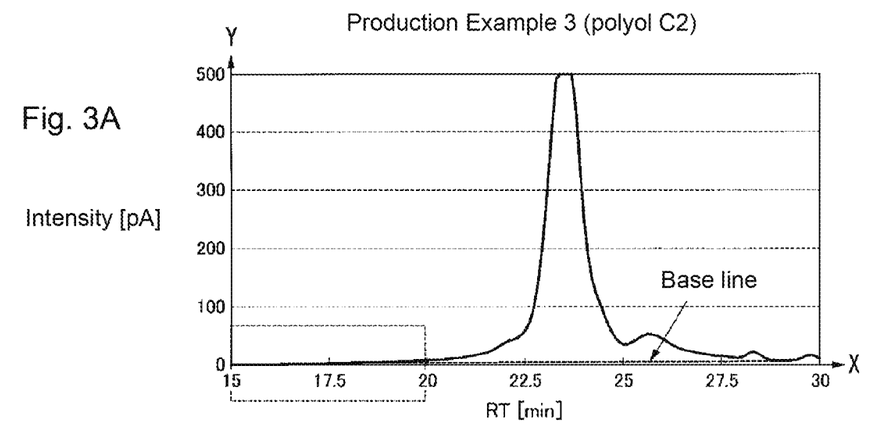
FIG. 3A is the whole chromatogram.

(1) A polyether polyol as a test specimen was dissolved in THF for HPLC at a concentration of 0.6 mass %, and passed through a syringe filter having a pore size of 0.45 µm to prepare a sample, which was analyzed under the above HPLC conditions, to obtain a chromatogram of which the X axis represents the retention time and the Y axis represents the signal intensity. Since measurement was conducted at a high concentration so as to distinctively observe the ultra-high molecular weight components, in the obtained chromatogram, the peak top was saturated (FIG. 3A).

(2) Using a polystyrene standard sample (manufactured by Agilent Technologies, tradename: Easical PS-2, molecular weight range: 580 to 400,000), a calibration curve representing the relation between the molecular weight and the retention time was prepared.

Figure 3B:
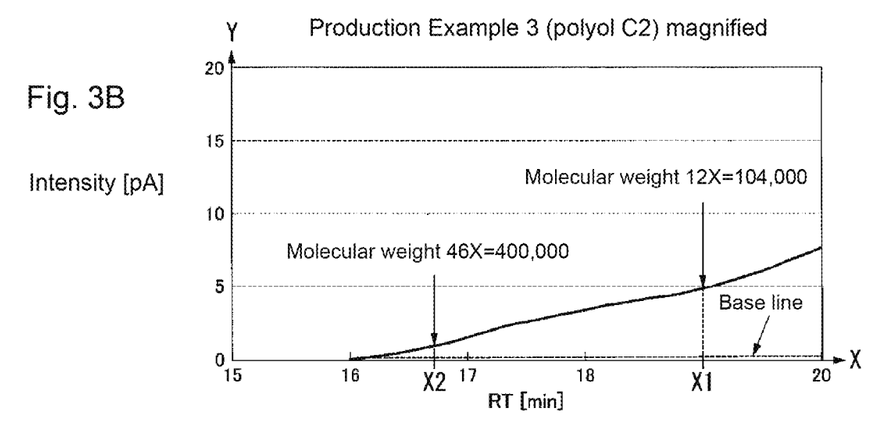
FIG. 3B is a chromatogram magnified at a dotted line portion in FIG. 3A.

(3) Using the calibration curve prepared in (2), the retention time X1 corresponding to the above 12× and the retention time X2 corresponding to the above 46× were obtained (FIG. 3B).

(4) The area of the portion surrounded by the chromatogram, the base line, a line of X=X1 and a line of X=X2 was electrically obtained by integration.

Figure 4:
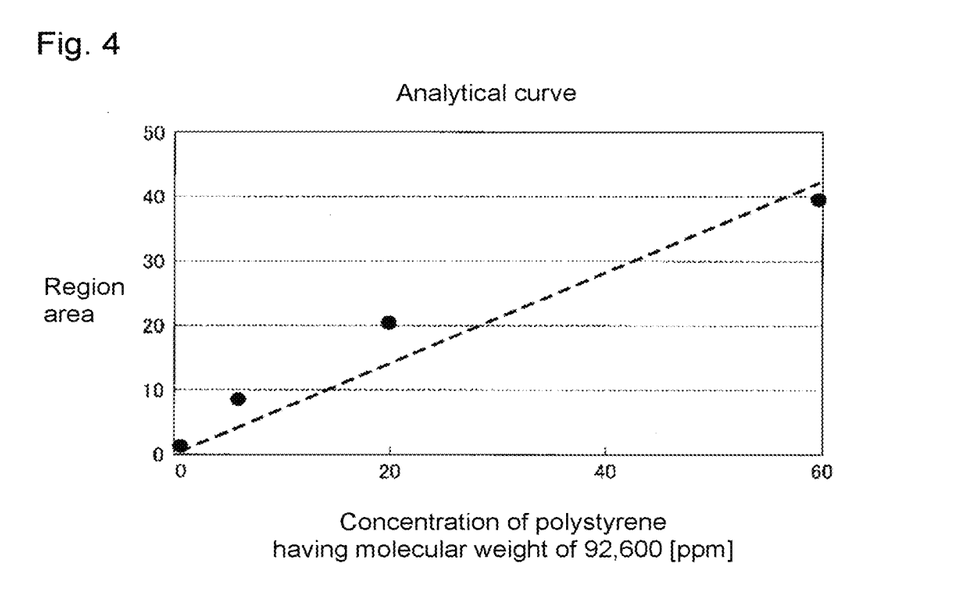
FIG. 4 is an analytical curve used to calculate the content of ultra-high molecular weight components described later.

(5) Using as a sample a standard solution having a polystyrene standard sample having a molecular weight of 92,600 (manufactured by Gas Chromatography Industrial Co., Ltd., tradename: PSS-05 No. 500-16) dissolved at a concentration of 1, 6, 20 or 60 mass ppm in THF for HPLC, analysis was conducted under the above HPLC conditions to obtain a chromatogram. The area of a portion surrounded by the obtained chromatogram and the base line is taken as the region area. The region area at each concentration was calculated to prepare an analytical curve with an intercept of 0 representing the relation between the concentration of the polystyrene having a molecular weight of 92,600 and the region area, by least squares method (FIG. 4).

(6) Using the analytical curve prepared in (5), the area obtained in (4) was calculated as the concentration of the polystyrene having a molecular weight of 92,600, which was taken as the concentration of ultra-high molecular weight components in the sample prepared in (1).

(7) From the concentration of the ultra-high molecular weight components obtained in (6), the mass of the ultra-high molecular weight components in the sample prepared in (1) was calculated and further the content of the ultra-high molecular weight components to the mass of the test specimen (polyether polyol) used to prepare the sample was calculated.

With respect to the after-described polyols C5 and C6, the content of each component obtained by fractionation was calculated in accordance with the above method except that in the above (3) and (4), the calibration curve prepared in (2) was used, and the sample was fractionated into regions corresponding to the respective molecular weight ranges with retention times corresponding to molecular weights of from 40,000 to 60,000, from 200,000 to 400,000, and from 400,000 to 1,320,000, and the area of each region was electrically obtained by integration. The results are shown in Table 2.

Calculation of Content of Ultra-High Molecular Weight Components (ELSD-HPLC Method)

With respect to the after-described polyols C5 and C6, the content was calculated with respect to each component obtained by fractionation as follows, using the following ELSD as the detector. The results are shown in Table 2.

HPLC Conditions

Apparatus and detector: NexeraX2 (ELSD-LTII) (manufactured by Shimadzu Corporation). Degasser: DGU-20A, pump: LC-20AD, autosampler: SIL-20AC, column compartment: CTO-20AC, evaporative light scattering detector: ELSD-LTII).

Eluent: THF for HPLC

Flow rate of eluent: 0.2 mL/min

Amount of sample injected: 20 µL

Column: One column on the upstream side and one column of the downstream side were connected in series in this order.

The column on the upstream side and the column on the downstream side were respectively the same as the columns used for the above CAD-HPLC method.

(1) A polyether polyol (sample 1 or sample 2) as a test specimen was dissolved in THF for HPLC at a concentration of 1.0 mass % to prepare a sample, which was analyzed under the above GPC conditions, to obtain a chromatogram of which the X axis represents the retention time and the Y axis represents the signal intensity.

(2) A calibration curve representing the relation between the molecular weight and the retention time was prepared by using a polystyrene standard sample (manufactured by Agilent Technologies, tradename: Easical PS-2, molecular weight range: 580 to 400,000).

(3) Using the calibration curve prepared in (2), the sample was fractionated into regions corresponding to the respective molecular weight ranges with retention times corresponding to molecular weights of from 40,000 to 60,000, from 200,000 to 400,000 and from 400,000 to 1,320,000, and the area of each region was electrically obtained by integration.

(4) The proportion of the area of the region corresponding to each molecular weight range obtained in (3) to the whole area of the polyether polyol as the test specimen was calculated as the content of a component within each molecular weight range.

Preparation Example 1: Preparation of TBA-DMC Catalyst (Slurry S1)

A zinc hexacyanocobaltate complex (hereinafter referred to as "TBA-DMC catalyst") having tert-butyl alcohol (hereinafter referred to as "TBA") coordinated was prepared by the following method.

A polyoxypropylene diol (hereinafter referred to as "polyol P1") having an average number of hydroxy groups per molecule of 2 and Mn of 2,000, obtained by subjecting PO to ring-opening addition polymerization to propylene glycol in the presence of a KOH catalyst, followed by dealkalization purification was prepared.

In a 500 mL flask, an aqueous zinc chloride solution comprising 10.2 g of zinc chloride and 10 g of water was put. While the aqueous zinc chloride solution was stirred at 300 revolutions per minute, an aqueous potassium hexacyanocobaltate solution comprising 4.2 g of potassium hexacyanocobaltate and 75 g of water was dropwise added to the aqueous zinc potassium solution over a period of 30 minutes. During the dropwise addition, the mixed solution in the flask was kept at 40° C. After completion of dropwise addition of the aqueous potassium hexacyanocobaltate aqueous solution, the mixture in the flask was stirred further for 30 minutes, and a mixture comprising 80 g of TBA, 80 g of water and 0.6 g of the polyol P1 was added, followed by stirring at 40° C. for 30 minutes and further at 60° C. for 60 minutes. The obtained mixture was subjected to filtration using a circular filter plate having a diameter of 125 mm and a quantitative filter paper for particles (manufactured by ADVANTEC Toyo Kaisha, Ltd., tradename: No. 5C) under elevated pressure (0.25 MPa) to obtain a solid containing a double metal cyanide complex (hereinafter referred to as "cake").

The cake was put in a flask, a mixed liquid comprising 36 g of TBA and 84 g of water was added, followed by stirring for 30 minutes, and the mixture was subjected to filtration under elevated pressure under the same conditions as above. The obtained cake was put in a flask, and a mixed liquid comprising 108 g of TBA and 12 g of water was further added, followed by stirring for 30 minutes, to obtain a dispersion having the double metal cyanide complex catalyst dispersed in the TBA-water mixed liquid. 120 g of the polyol was added to the dispersion, volatile components were distilled off under reduced pressure at 80° C. for 3 hours, and further volatile components were distilled off at 115° C. for 3 hours to obtain a slurry of TBA-DMC catalyst (hereinafter referred to as "slurry Si"). The concentration of the TBA-DMC catalyst in the slurry was 5.33 mass %.

Preparation Example 2: Preparation of TBA-DMC Catalyst (Slurry S2)

In the method described in paragraphs [0094] to [0099] in Japanese Patent No. 4556496, a slurry of the TBA-DMC catalyst (hereinafter referred to as "slurry S2") was prepared.

Preparation Example 3: Preparation of TBA-DMC Catalyst (Slurry S3)

In the method described in paragraphs [0050] and [0051] in Japanese Patent No. 4949605, a slurry of the TBA-DMC catalyst (hereinafter referred to as "slurry S3") was prepared.

Production Example 1: Production of Polyol C1

PO was subjected to ring-opening addition polymerization to glycerin using a KOH catalyst, followed by purification using KYOWAAD 600S (manufactured by Kyowa Chemical Industry Co., Ltd., tradename, synthetic adsorbent) to produce a polyoxypropylene triol (initiator 1) having Mn of 1,500 and a hydroxy value of 112 mgKOH/g.

Into a reactor, 1,000 g of the initiator 1 and the slurry S2 in an amount such that the concentration of the metal of the TBA-DMC catalyst in the reaction liquid would be 46 ppm were added to obtain a reaction liquid.

Then, the system in the reactor was replaced with nitrogen, and the reaction liquid was heated with stirring and when it reached 135° C., heating was stopped, and 120 g of PO was supplied to the reactor and reacted while stirring was continued.

It was confirmed that when PO was supplied to the reactor, the internal pressure in the reactor once increased and then gradually decreased and reached the same internal pressure in the reactor immediately before supply of PO. During this period, the decrease of the internal pressure was followed by an increase of the temperature of the reaction liquid once and then by gradual decrease. After the temperature increase of the reaction liquid stopped, the reaction liquid was cooled to 135° C.

Then, while the reaction liquid was stirred, the reaction liquid was kept at 135° C., and 4,728 g of PO was supplied to the reactor. It was confirmed that the internal pressure no more changed and the reaction was completed, and then 20 g of a KOH catalyst was added, to carry out alkoxylation by dehydration at 120° C. for 2 hours. Then, while the reaction liquid was maintained at 120° C., 950 g of EO was additionally supplied to the pressure resistant reactor. It was confirmed that the internal pressure no more changed and the reaction was completed, and then the catalyst was neutralized and removed by KYOWAAD 600S.

Of the obtained polyol (hereinafter referred to as "polyol C1"), the average number of hydroxy groups, the hydroxy value, the degree of unsaturation, the viscosity, the EO content, the terminal EO-added molar number, Mw/Mn, the number average molecular weight X, the molecular weight range (12× to 46×) of ultra-high molecular weight components, and the content of the ultra-high molecular weight components are shown in Table 1 (the same applies hereinafter).

Production Example 2: Production of Polyol A1

The polyol C1 obtained in Production Example 1 was dissolved in THF in a proportion of 10 ml per 1 g of the polyol C1 to prepare a sample. The sample was injected in an amount of 12 ml/time into a preparative GPC apparatus (manufactured by YMC, tradename: K-prep, column: YMC-GPC T60000-40 (column length: 600 mm, inner diameter: 40 mm)) using THF as the eluent, and the flow rate was adjusted to 20 minutes/one cycle. A fraction obtained after a lapse of 5 minutes from detection of the rise of the peak from the base line was taken as polyol A1.

Production Example 3: Production of Polyol C2

Into the reactor in Production Example 1, 1,500 g of the initiator 1 and the slurry S1 in an amount such that the concentration of the metal in the TBA-DMC catalyst would be 123 ppm in the reaction liquid were added.

Then, the system in the reactor was replaced with nitrogen, and the reaction liquid was heated with stirring and when it reached 120° C., heating was stopped, and 75 g of PO was supplied to the reactor and reacted while stirring was continued.

It was confirmed that the internal pressure in the reactor reached the same as the internal pressure in the pressure-resistant reactor immediately before supply of PO. After the temperature increase of the reaction liquid stopped, the reaction liquid was cooled to 135° C.

Then, while the reaction liquid was stirred, it was confirmed that the reaction liquid was cooled to 130° C., and 4,647 g of PO was supplied to the reactor while the reaction liquid was kept at 130° C. It was confirmed that the internal pressure no more changed and the reaction was completed, and then 20 g of the KOH catalyst was added, to carry out alkoxylation by dehydration at 140° C. for 4 hours. Then, while the reaction liquid was kept at 130° C., 988 g of EO was additionally supplied to the reactor. It was confirmed that the internal pressure no more changed and the reaction was completed, the catalyst was neutralized and removed in the same manner as in Production Example 1 to obtain polyol C2.

Production Example 4: Production of Polyol A2

The polyol C2 obtained in Production Example 3 was fractionated under the same conditions as in Production Example 2 to obtain polyol A2. In Production Example 4, the fraction with a retention time of from 17.3 to 22.3 minutes was obtained.

Production Example 5: Production of Polyol C3

In the same manner as in Production Example 3 except that the amount of PO supplied second was 4,481 g, and the amount of EO supplied was 1,154 g, polyol C3 was obtained.

Production Example 6: Production of Polyol A3

The polyol C3 obtained in Production Example 5 was fractionated under the same conditions as in Production Example 4 to obtain polyol A3.

Production Example 7: Production of Polyol C4

In the same manner as in Production Example 3 except that the slurry S3 was used instead of the slurry S1, polyol C4 was obtained.

Production Example 8: Production of Polyol C5

In the same manner as in Example 1 described in JP-A-2002-517578 (paragraphs [0035], [0036] and [0040]), a polyether polyol having a number of functional groups of 3 was adjusted to have a hydroxy value of 56 mgKOH/g and a molecular weight of about 3,000 (56,100×3/56) to obtain polyol C5. Regions corresponding to the respective molecular weight ranges were obtained with retention times corresponding to molecular weights of from 40,000 to 60,000, from 200,000 to 400,000 and from 400,000 to 1,320,000, and the contents of the respective components in the regions were calculated in accordance with the CAD-HPLC method and the ELSD-HPLC method, and the results are shown in Table 2.

Production Example 9: Production of Polyol C6

Polyol C6 was obtained in the same manner as in Production Example 8 except that the polyether polyol having a number of functional groups of 3 was adjusted to have a hydroxy value of 56 mgKOH/g and a molecular weight of about 3,000 (56,100×3/56) in the same manner as in Example 3 of JP-A-2002-517578. The contents of the respective components obtained in the same manner as in Production Example 8 are shown in Table 2.

TABLE 1

| | | Production Example 1 | Production Example 2 | Production Example 3 | Production Example 4 | Production Example 5 | Production Example 6 | Production Example 7 |
|---|---|---|---|---|---|---|---|---|
| Polyol | | C1 | A1 | C2 | A2 | C3 | A3 | C4 |
| Average number of hydroxy groups | | 3 | 3 | 3 | 3 | 3 | 3 | 3 |
| Hydroxy value [mgKOH/g] | | 16.8 | 16.8 | 24.3 | 24.3 | 25.3 | 25.3 | 24.7 |
| Degree of unsaturation [meq/g] | | 0.007 | 0.007 | 0.008 | 0.008 | 0.007 | 0.007 | 0.006 |
| Viscosity (25° C.) [mPa·s] | | 2,800 | 2,800 | 1,500 | 1,500 | 1,600 | 1,600 | 1,500 |
| EO content [mass %] | | 14.0 | 14.0 | 13.3 | 13.7 | 15.2 | 15.2 | 13.7 |
| Terminal EO-added molar number [mol] | | 32 | 32 | 21 | 22 | 23 | 23 | 21 |
| Mw/Mn | | 1.05 | 1.05 | 1.02 | 1.02 | 1.03 | 1.02 | 1.03 |
| Number average molecular weight X | | 14,800 | 15,100 | 8,700 | 8,800 | 9,900 | 10,100 | 8,600 |
| Molecular weight range of ultra-high molecular weight components ×$10^4$ | 12X | 17.8 | 18.1 | 10.1 | 10.6 | 11.9 | 12.1 | 10.3 |
| | 46X | 68.1 | 69.5 | 40.0 | 40.5 | 45.5 | 46.5 | 39.6 |
| Content of ultra-high molecular weight components [ppm] | | 1,251 | 97 | 1,726 | 741 | 1,158 | 152 | 2,155 |

TABLE 2

| Polyol | Number average molecular weight Mn | measurement method | Molecular weight [mass ppm] | | |
|---|---|---|---|---|---|
| | | | 40,000 to 60,000 | 200,000 to 400,000 | 400,000 to 1,320,000 |
| C5 | 3,567 | ELSD | 1 | 0 | 0 |
| | | CAD | 2,808 | 1,431 | 743 |
| C6 | 3,555 | ELSD | 145 | 0 | 0 |
| | | CAD | 4,273 | 1,856 | 888 |

Production Example 8: Production of Polymer-Dispersed Polyol

PO was subjected to ring-opening addition polymerization to glycerin using a KOH catalyst to obtain polyether polyol having Mn of 1,300 (initiator 2).

Into the same reactor as in Production Example 1, 1,767 g of the initiator 2, 20 g of the KOH catalyst and 4,641 g of PO were charged and stirred at 120° C. for 8 hours to conduct ring-opening addition polymerization. Then, 1,141 g of EO was further added, followed by stirring at 110° C. for 1.5 hours to conduct ring-opening addition polymerization to obtain a base polyol having EO added to its terminal.

Of the base polyol, the average number of hydroxy groups was 3, the hydroxy value was 34 mgKOH/g, the degree of unsaturation was 0.065 meq/g, the EO content was 14.5 mass %, and the terminal EO-added molar number was 16.3.

In the base polyol, a monomer mixture comprising 77.5 mass % of acrylonitrile and 22.5 mass % of styrene was polymerized to obtain polymer-dispersed polyol containing 35 mass % of polymer particles (hereinafter referred to as "polyol POP"). The hydroxy value of the polyol POP was 24 mgKOH/g.

Production of Flexible Polyurethane Foam

The following materials were used.

[Crosslinking Agent E1] A polyether polyol having a hydroxy value of 562 mgKOH/g, obtained by subjecting EO to ring-opening addition polymerization to pentaerythritol in the presence of a KOH catalyst.

[Crosslinking agent E2] Diethanolamine.

[Crosslinking agent E3] A polyether polyol having a hydroxy value of 445 mgKOH/g and an EO content of 28 mass %, obtained by subjecting PO to ring-opening addition polymerization to sorbitol in the presence of a KOH catalyst and then subjecting EO to ring-opening addition polymerization.

[Cell opener F1] A polyether polyol having a hydroxy value of 48 mgKOH/g and an EO content of 80 mass %, obtained by subjecting a mixture of PO and EO to ring-opening addition polymerization to glycerin in the presence of a KOH catalyst.

[Cell opener F2] A polyether polyol having a hydroxy value of 28 mgKOH/g and an EO content of 80 mass %, obtained by subjecting a mixture of PO and EO to ring-opening addition polymerization to glycerin in the presence of a KOH catalyst.

[Catalyst G1] A dipropylene glycol solution containing 33 mass % of triethylenediamine (manufactured by TOSOH CORPORATION, tradename: TEDAL33).

[Catalyst G2] A dipropylene glycol solution containing 70 mass % of bis-(2-dimethylaminoethyl) ether (manufactured by TOSOH CORPORATION, tradename: TOYOCATET).

[Foam stabilizer H1] Manufactured by Dow Corning Toray Co., Ltd., tradename: SZ-1325.

[Foam stabilizer H2] Manufactured by EVONIK, tradename: TegostabB-8724LF2.

[Blowing agent D1] Water.

[Polyisocyanate compound] Manufactured by TOSOH CORPORATION, tradename: CORONATE 1021 (a mixture comprising 80 mass % of a mixture comprising 80 mass % of 2,4-TDI and 20 mass % of 2,6-TDI, and 20 mass % of polymethylene polyphenyl polyisocyanate (common name: polymeric MDI)).

Ex. 1 to 8

Ex. 1, 3 and 6 are Examples of the present invention, and Ex. 2, 4, 5, 7 and 8 are Comparative Examples.

Blend ratios of the polyol and the like (the type of the polyol is shown in Table 4) for producing a flexible polyurethane foam are shown in Table 3. The unit of the blend ratio of the polyisocyanate compound is represented by the isocyanate index ("index" in Table 3), and the units of the blend ratios of the other components are parts by mass.

In Table 4, the blend shown in Table 3 and the type of the polyol in said blend, and the evaluation of the flexible polyurethane foam obtained by said blend are shown.

Among the components shown in Table 3, the components except for the polyisocyanate compound and the polyol shown in Table 3 were weighed in a plastic container having a capacity of 2 L, and stirred by using a mixer with an agitating blade at a rate of revolutions of 3,000 rpm for 30 seconds and mixed to prepare a polyol system solution.

Separately, the polyisocyanate compound was weighed in a plastic container having a capacity of 500 mL.

Further, an aluminum mold of 400 mm in length and in width and 100 mm or 70 mm in thickness was prepared and adjusted to a temperature of 60° C.

Production of Flexible Polyurethane Foam Using Polyol System Solution Before Storage The polyol system solution immediately after preparation was adjusted to have a liquid temperature of 30° C., and the polyisocyanate compound was adjusted to have a liquid temperature of 25° C., and then the polyisocyanate compound was charged into the polyol system solution and stirred and mixed by using the above mixer at a rate of revolutions 3,000 rpm for 5 second to prepare a reactive mixture. The reactive mixture immediately after preparation was poured into the above aluminum mold the top of which was open, and the upper mold was quickly closed to carry out foaming and molding in a closed state. 6 Minutes after initiation of the molding, which was a point when the polyisocyanate compound was charged into the polyol system solution, the upper mold was opened, and a flexible polyurethane foam was taken out and subjected to crushing as follows and then left to stand in a room (temperature: 23° C., relative humidity: 50%) for 24 hours to obtain a flexible polyurethane foam.

The above crushing is an operation of continuously compressing the flexible polyurethane foam after taken out from the mold up to 75% of the thickness of the flexible polyurethane foam.

Production of Flexible Polyurethane Foam Using Polyol System Solution After Storage The above prepared polyol system solution was stored for 7 days (168 hours) in a state where it was left at rest in an atmosphere at 50° C., and then a flexible polyurethane foam was produced by using the polyol system solution under the same conditions as above.

Evaluation Methods

With respect to the flexible polyurethane foam produced by using the polyol system solution before storage or the polyol system solution after storage, the items as identified in Table 4 were evaluated by the following methods. The results are shown in Table 4.

The whole density, the core density, the 25% ILD hardness, the 65% ILD hardness, the air permeability of the core portion, the entire rebound resilience, the rebound resilience of core portion, the tear strength, the tensile strength, the elongation, the compression set, the compression set under humid conditions and the hysteresis loss were measured in accordance with JIS K6400 (1997). The 25% ILD hardness, the 65% ILD hardness and the hysteresis loss were measured as pressurized by a pressure plate of 314 cm$^2$.

The core density and the rebound resilience of core portion were evaluated by using a sample cut out from the center portion of the obtained flexible polyurethane foam in a size of 100 mm in length×100 mm in width x a predetermined height (50 mm in height when the mold thickness is 100 mm, and 30 mm in height when the mold thickness is 70 mm).

The stress relaxation percentage was the stress relaxation percentage (%) 5 minutes after pressed by a 314 cm$^2$ pressure plate under 196N.

The initial thickness in the ILD hardness was the thickness of the flexible polyurethane foam under a load of 5N.

As the vibration characteristics, the resonance frequency and the resonance ratio (the absolute displacement measurement) were measured by methods in accordance with JASOB8407-82. As the conditions for measuring the vibration characteristics, a Tekken plate (490N) was used as a pressure plate, and the vibration total amplitude was adjusted to be 5 mm.

With respect to the compression set and the compression set under humid conditions, the smaller the value is, the better the durability becomes.

When the value of the resonance frequency is at most 5 Hz, when the flexible polyurethane foam is used for a seat cushion for an automobile, efficient damping of the vibration in a frequency region to which human is sensitive is taken, and good riding comfortability will be obtained.

With respect to the flexible polyurethane foam produced by using the polyol system solution after storage, the initial thickness in the ILD hardness, the 25% ILD hardness and the mechanical properties (teat strength, tensile strength and elongation) were measured in the same manner as above.

The change rates of mechanical properties represent the proportions (unit: %) of the respective mechanical properties of the flexible polyurethane foam produced by using the polyol system solution after storage to the respective mechanical properties of the flexible polyurethane foam produced by using the polyol system solution before storage.

A higher value of the change rate means a smaller change of the mechanical properties between before and after storage.

TABLE 3

| Blend [parts by mass] | | Blend 1 | Blend 2 | Blend 3 |
|---|---|---|---|---|
| Polyol | | 92 | 92 | 70 |
| POP | | 5 | 8 | 30 |
| Crosslinking agent | E1 | 3 | — | — |
| | E2 | 0.5 | 0.5 | — |
| | E3 | — | — | 3 |
| Cell opener | F1 | 1 | 2 | — |
| | F2 | — | — | 1 |
| Catalyst | G1 | 0.55 | 0.75 | 0.5 |
| | G2 | 0.03 | 0.06 | 0.05 |
| Foam stabilizer | H1 | 0.8 | 1.5 | — |
| | H2 | — | — | 1 |
| Blowing agent | D1 | 2.5 | 4.8 | 3.5 |
| Polyisocyanate compound [index] | | 100 | 100 | 100 |

TABLE 4

| Polyol system solution [parts by mass] | | Blend | | Ex. 1 Blend 1 | Ex. 2 Blend 1 | Ex. 3 Blend 2 | Ex. 4 Blend 2 |
|---|---|---|---|---|---|---|---|
| | | Type of polyol | | A1 | C1 | A2 | C2 |
| Foam physical properties before storage | Density | Whole density | [Kg/m$^3$] | 71.9 | 72.1 | 34.4 | 34.8 |
| | | Core density | [Kg/m$^3$] | 63.7 | 64.6 | 31.3 | 31.3 |
| | ILD density | Initial thickness | [mm] | 67.0 | 67.0 | 63.7 | 65.8 |
| | | 25% | [%] | 199 | 245 | 77 | 85 |
| | | 65% | [%] | 504 | 519 | 222 | 230 |
| | Air permeability of core portion | | [L/min] | 26.5 | 14.8 | 33.3 | 34.8 |
| | Rebound resilience | Whole | [%] | 80 | 73 | 57 | 57 |
| | | Core portion | [%] | 76 | 65 | 61 | 65 |
| | Mechanical properties | Tear strength | [N/cm] | 4.4 | 3.2 | 4.1 | 3.9 |
| | | Tensile strength | [kPa] | 95 | 67 | 115 | 93 |
| | | Elongation | [%] | 118 | 94 | 120 | 107 |
| | Compression set | | [%] | 1.8 | 1.4 | 3.0 | 2.1 |
| | Compression set under humid conditions | | [%] | 5.3 | 4.7 | 14.8 | 12.9 |
| | Hysteresis loss | | [%] | 10.8 | 12.4 | 18.1 | 18.0 |
| | Stress relaxation percentage | | [%] | 5.8 | 6.9 | 10.8 | 10.4 |
| | Resonance frequency | | [Hz] | 3.6 | 3.3 | — | — |
| | Resonance ratio | | (A/A0) | 3.6 | 2.9 | — | — |
| Foam physical properties after storage | ILD density | Initial thickness | [mm] | 66.6 | 67.3 | 65.1 | Collapsed |
| | | 25% | [N/314 cm$^2$] | 202 | 239 | 77 | |
| | Mechanical properties | Tear strength | [N/cm] | 4.2 | 2.3 | 3.8 | |
| | | Tensile strength | [kPa] | 91 | 47 | 103 | |
| | | Elongation | [%] | 108 | 61 | 108 | |

TABLE 4-continued

| | | | | | | | |
|---|---|---|---|---|---|---|---|
| | Change rate of mechanical properties | Tear strength | [%] | 95 | 73 | 93 | — |
| | | Tensile strength | [%] | 96 | 70 | 89 | — |
| | | Elongation | [%] | 92 | 65 | 90 | — |

| Polyol system solution | | Blend | | Ex. 5 Blend 2 | Ex. 6 Blend 3 | Ex. 7 Blend 3 | Ex. 8 Blend 3 |
|---|---|---|---|---|---|---|---|
| [parts by mass] | | Type of polyol | | C4 | A3 | C1 | C3 |
| Foam physical properties before storage | Density | Whole density | [Kg/m³] | 34.5 | 50.7 | 50.8 | 49.7 |
| | | Core density | [Kg/m³] | 31.5 | 46.2 | 47.5 | 46.3 |
| | ILD density | Initial thickness | [mm] | 65.1 | 95.2 | 92.5 | 100.1 |
| | | 25% | [%] | 72 | 254 | 244 | 201 |
| | | 65% | [%] | 208 | 715 | 649 | 498 |
| | Air permeability of core portion | | [L/min] | 30.1 | 28.8 | 12.0 | 12.8 |
| | Rebound resilience | Whole | [%] | 54 | 63 | 64 | 48 |
| | | Core portion | [%] | 60 | 69 | 62 | 51 |
| | Mechanical properties | Tear strength | [N/cm] | 4.0 | 6.8 | 6.5 | 3.2 |
| | | Tensile strength | [kPa] | 111 | 180 | 162 | 53 |
| | | Elongation | [%] | 105 | 113 | 109 | 64 |
| | Compression set | | [%] | 2.3 | 3.2 | 3.6 | 1.7 |
| | Compression set under humid conditions | | [%] | 14.1 | 15.4 | 15.0 | 9.3 |
| | Hysteresis loss | | [%] | 18.2 | 19.2 | 18.2 | 22.1 |
| | Stress relaxation percentage | | [%] | 10.9 | 10.9 | 9.0 | 11.4 |
| | Resonance frequency | | [Hz] | — | 3.5 | 3.5 | 3.8 |
| | Resonance ratio | | (A/A0) | — | 4.0 | 2.8 | 2.2 |
| Foam physical properties after storage | ILD density | Initial thickness | [mm] | Collapsed | 95.3 | 95.4 | 100.5 |
| | | 25% | [N/314 cm²] | | 257 | 296 | 206 |
| | Mechanical properties | Tear strength | [N/cm] | | 6.6 | 4.9 | 2.7 |
| | | Tensile strength | [kPa] | | 163 | 99 | 35 |
| | | Elongation | [%] | | 107 | 84 | 54 |
| | Change rate of mechanical properties | Tear strength | [%] | — | 97 | 76 | 82 |
| | | Tensile strength | [%] | — | 90 | 61 | 65 |
| | | Elongation | [%] | — | 95 | 77 | 84 |

As shown in Table 2, ultra-high molecular weight components of the polyether polyol in the present invention cannot be detected with high precision by ELSD which has been commonly used as a detector, and cannot be controlled, and accordingly it is essential to control their content by detecting them with high precision using a CAD.

Figure 1A:
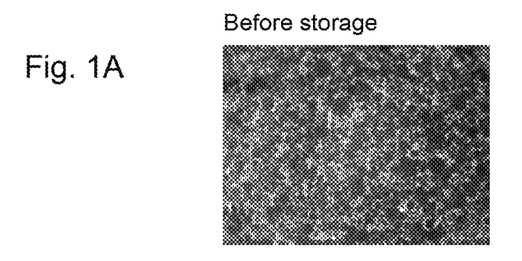
FIG. 1A is a photograph of a cross section of a flexible polyurethane foam obtained by using a polyol system solution before storage.
Figure 1B:
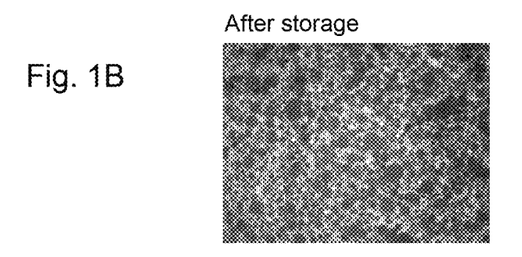
FIG. 1B is a photograph of a cross section of a flexible polyurethane foam obtained by using a polyol system solution after storage.

FIGS. 1A and 1B are photographs of a cross section of a flexible polyurethane foam obtained in Ex. 1, and FIG. 1A illustrates a flexible polyurethane foam (average cell diameter: 742 μm) formed by using the polyol system solution before storage, and FIG. 1B illustrates a flexible polyurethane foam (average cell diameter: 769 μm) formed by using the polyol system solution after storage.

Figure 2A:
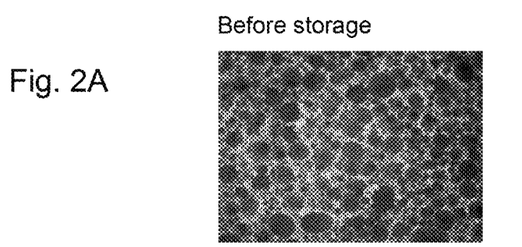
FIG. 2A is a photograph of a cross section of a flexible polyurethane foam obtained by using a polyol system solution before storage.
Figure 2B:
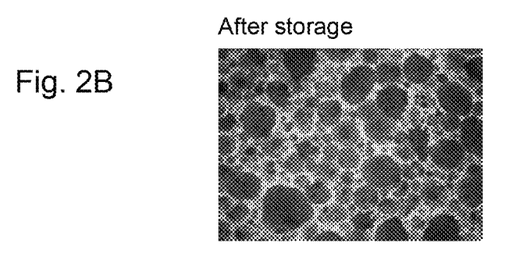
FIG. 2B is a photograph of a cross section of a flexible polyurethane foam obtained by using a polyol system solution after storage.

FIGS. 2A and 2B are photographs of a cross section of a flexible polyurethane foam obtained in Ex. 2, and FIG. 2A illustrates a flexible polyurethane foam (average cell diameter: 1,107 μm) formed by using the polyol system solution before storage, and FIG. 2B illustrates a flexible polyurethane foam (average cell diameter: 1,714 μm) formed by using the polyol system solution after storage.

As shown in FIGS. 1A and 1B and 2A and 2B, in Ex. 2 in which the polyol C1 was used, the average cell diameter of the flexible polyurethane foam increased if the polyol system solution was stored, whereas in Ex. 1 in which the polyol A1 was used, the average cell diameter of the flexible polyurethane foam did not substantially change even if the polyol system solution was stored.

As shown in Table 4, in Ex. 1 in which the polyol A1 was used, in Ex. 3 in which the polyol A2 was used and in Ex. 6 in which the polyol A3 was used, the change rate of mechanical properties was high, and a decrease of physical properties of the flexible polyurethane foam by the polyol system solution being stored was small.

On the other hand, in Ex. 2 and 7 in which the polyol C1 was used and in Ex. 8 in which the polyol C3 was used, the change rate of the mechanical properties was low, and the decrease of physical properties of the flexible polyurethane foam was large if the polyol system solution was stored. Further, as shown in Table 4, in Ex. 4 in which the polyol C2 was used and in Ex. 5 in which the polyol C4 was used, collapse occurred when the polyol system solution after storage was foamed.

Further, as shown by the results in Ex. 1, 3 and 6, the storage stability of the polyol system solution can be improved even without limiting the terminal EO added molar number to be at most 23 mol, and accordingly the polyether polyol of the present invention has a high degree of freedom in the design of a polyurethane foam.

This application is a continuation of PCT Application No. PCT/JP2019/004887, filed on Feb. 12, 2019, which is based upon and claims the benefit of priority from Japanese Patent Application No. 2018-024193 filed on Feb. 14, 2018. The contents of those applications are incorporated herein by reference in their entireties.

What is claimed is:

1. A polyether polyol having a polyoxyalkylene chain consisting of oxyalkylene units, and having a degree of unsaturation of at most 0.020 meq/g, a hydroxy value of from 1 to 80 mgKOH/g, a content of oxyethylene units to the total mass of the polyether polyol of from 0 to 50 mass %, a number average molecular weight which is a molecular weight as calculated based on a polystyrene standard determined by gel permeation chromatography of from 2,000 to 50,000, and ultra-high molecular weight components, which have molecular weights of from 12 to 46 times the number average molecular weight of the polyether polyol, that are present in an amount not more than 1,000 mass ppm.

2. The polyether polyol according to claim 1, which has an average number of hydroxy groups per molecule of the polyether polyol of from 2 to 8.

3. The polyether polyol according to claim 1, wherein the oxyalkylene unit has from 2 to 4 carbon atoms.

4. The polyether polyol according to claim 1, wherein at least part of the oxyalkylene units at the terminal of the polyoxyalkylene chain are oxyethylene units.

5. The polyether polyol according to claim 1, which contains oxypropylene units as the oxyalkylene units other than oxyethylene units, and has a content of the oxypropylene units of at least 50 mass %.

6. The polyether polyol according to claim 1, which is a polyether polyol obtained by subjecting propylene oxide to ring-opening addition polymerization to an initiator, and then subjecting ethylene oxide to ring-opening addition polymerization.

7. The polyether polyol according to claim 6, which is a polyether polyol obtained by conducting the ring-opening addition polymerization of propylene oxide in the presence of a double metal cyanide complex catalyst.

8. The polyether polyol according to claim 1, for producing a polyurethane foam.

9. The polyether polyol according to claim 8, wherein the polyurethane foam is a flexible polyurethane foam.

10. A composition for producing a polyurethane foam, which contains the polyether polyol as defined in claim 1.

11. A polyol system solution, which contains the polyether polyol as defined in claim 1, a catalyst, and a blowing agent.

12. The polyol system solution according to claim 11, which is a polyol system solution for producing a polyurethane foam by molding method.

13. The polyether polyol according to claim 1, wherein the content of ultra-high molecular weight components is determined by CAD-HPLC.

* * * * *